J. P. WILLIAMS.
SNAP FASTENER.
APPLICATION FILED JULY 20, 1911.

1,044,111.

Patented Nov. 12, 1912.

WITNESSES
Daniel Webster, Jr.
William Conway

INVENTOR
James P Williams
BY Cyrus N. Anderson
ATTORNEY

UNITED STATES PATENT OFFICE.

JAMES P. WILLIAMS, OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

SNAP-FASTENER.

1,044,111.

Specification of Letters Patent.

Patented Nov. 12, 1912.

Application filed July 20, 1911. Serial No. 639,626.

*To all whom it may concern:*

Be it known that I, JAMES P. WILLIAMS, a citizen of the United States, and a resident of Philadelphia, county of Philadelphia, State of Pennsylvania, have invented certain new and useful Improvements in Snap-Fasteners, of which the following is a specification.

My invention relates to improvements in snap fasteners of the character in which a socket member and a ball member are employed.

More particularly it relates to the construction of the socket member of the fastener.

One of the objects of my invention is to provide a fastener in which the socket member is of such a construction that it is very strong and durable.

Another object is to provide a socket member which is adapted to hold firmly and strongly against the sides of the ball portion of the ball member of the fastener but which at the same time in use may be placed in engagement with and disengaged from the ball with readiness and facility.

A further object of my invention is the production of the socket member of a fastener from a single plate of metal which is so shaped and constructed that two portions thereof are arranged in opposed relation to each other and in which the spring action required to hold the ball of the coöperating ball member is involved in the integrality of the structure.

A still further object of my invention is to construct the socket member of the fastener so that it will not only be strong and durable and possess the quality of closely gripping and firmly holding the ball member of the fastener but will possess the quality of thinness and consequent neatness in appearance.

Other objects and advantages of my invention will be referred to in the description thereof which follows or will be apparent therefrom.

One form of a convenient embodiment of my invention is illustrated in the accompanying drawing but it will be understood that changes in the details of construction within the scope of the claims may be made without departing therefrom.

Figure 1:
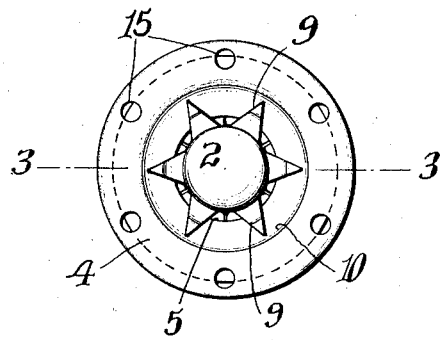
Figure 2:
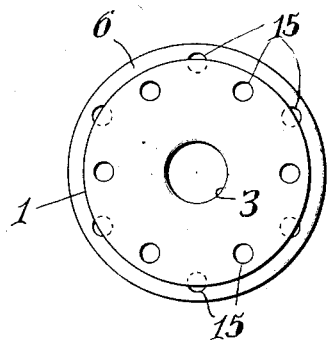
Figure 3:
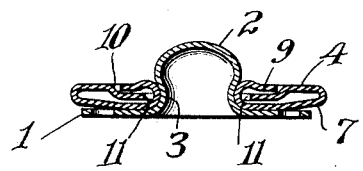
Figure 4:
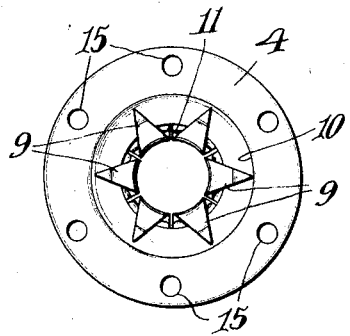
Figure 5:
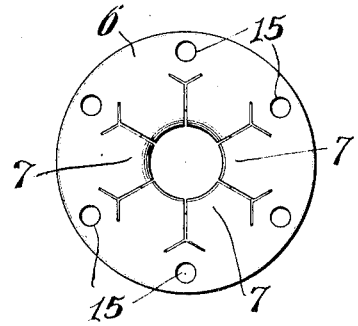

In the drawings:—Figure 1 is a plan view of one side of the socket member of the fastener with the head of the ball member projecting through the opening therein; Fig. 2 is a bottom plan view of the ball member of a snap fastener with the ball projecting through the opening in the socket member of the fastener and showing the edge or rim of the latter projecting beyond the edge of the said ball member; Fig. 3 is a transverse sectional view on the line 3—3 of Fig. 1; Fig. 4 is a plan view of one side of the socket member of the fastener; and Fig. 5 is a plan view of the opposite side thereof.

Referring to the drawings, 1 designates what may be termed the flange portion of the ball member of the fastener and 2 the ball of such member. The flange 1 and the ball 2 are connected by a neck 3, as indicated, which is of less diameter than the ball portion.

4 designates one side of the socket member of the fastener which member is formed from a metallic disk or plate and is provided with a central opening 5. The opposite side of the socket member is formed by bending the outer portion of the plate over and into close relation with the side 4 and consists of the solid portion 6 and the parts 7 which are integral with and extend inwardly from the portion 6. So constructed the outer edge of the portion 6 is integrally connected with the corresponding edge of the side 4 of the socket member. The parts 7 project through the opening 5 and are bent around the edge of the same, the ends thereof projecting over the inner portion of the side 4 surrounding the opening 5 as shown at 9.

Although the side which consists of the parts 6 and 7 together with the ends 9 of the latter which are bent or turned over the edge of the opening 5 constitute the spring element of the socket member of the fastener, yet such member is so shaped and constructed from a single plate of metal that the spring action thereof required to hold the ball of the coöperating ball member is involved in the integrality of the structure.

For the purpose of protecting the ends of the bent over parts 9, and securing flatness, the inner edge portion of the side 4 surrounding the spring 5 may be depressed, as indicated at 10, toward the parts 7. Although its presence is preferred, yet such depression may be omitted if desired without departing from my invention in its broader aspect.

Preferably, as shown in Fig. 3, the portions 9 are extended through the opening 5 a distance over and beyond the inner edge of the depressed portion 10 of the side 4 and are then bent over so that the ends thereof are brought into contact, or nearly so, with said depressed portion. By so extending and bending the parts 9 around the edge of the opening 5 the inner edge of the depressed portion 10 of the side 4 is spaced a short distance from the inside surfaces of the curved over parts 9 of the fastener.

The inner sides of the bends of the bent over portions 9 are spaced from the edge of the opening 5, as indicated at 11. By providing such spaces between the bends of the over turned parts 9 and the edge of the opening 5 and by bending the parts 9 to curvatures having radii of considerable length, the efficiency of the spring action is enhanced and provision is made for a receding movement of the parts projecting through the opening 5 to permit the passage of the ball of the ball member through the opening in the socket member between the said parts.

By means of the construction as thus described, I provide convex surfaces which extend transversely of the plane of the socket member of the fastener and which are arranged inside of and around the edge of the opening 5 and which are well adapted for engagement with the under side of the ball 2 and the neck 3 of the ball member. It is preferred that such convex surfaces should substantially fill the space between the ball 2 and the flange 1 surrounding the neck 3 so as to hold the said flange relatively close to the adjacent side of the socket member and so as to prevent rocking or tilting of the socket and ball members with respect to each other.

It should be understood that the ball 2 need not be of the shape shown, but may be of any shape which will permit it to pass between the spring-holding parts of the socket member and be held firmly by the engagement of such parts with the neck 3 and with said ball.

While I prefer that the ball 2 of the ball member should be inserted through the opening in the socket member from the side constituted of the parts 6 and 7, yet it may be inserted from the opposite side of the said socket member. The latter member operates equally well and with equal efficiency whether the ball be inserted therethrough from one side or the other.

The socket member, as illustrated, is provided with six projecting parts 7 but it should be understood that the number of such parts may be increased or diminished, within limits, as desired without materially affecting the efficiency of the fastener.

I have also shown the edges of the parts 7 in the completed fastener in contact or nearly so but it should be understood that they may be spaced from each other if such spacing should be desired.

I have provided thread holes 15 in the ball and socket members of the fastener by means of which such members may be secured to an article by threads sewed therethrough. These holes may be formed at any convenient or desired stage in the process of the manufacture of the fasteners and their number may be increased or diminished as desired. It will also be understood that any other convenient means may be employed for securing the same to the article.

Having thus described my invention, I claim:—

1. The socket member of a snap fastener consisting of a metallic plate having an opening therethrough, the metal of the said plate surrounding the said opening being depressed, and the outer portion of said plate being bent over and into operative relation to the inner portion thereof, the said outer bent over portion having parts which extend through and are bent around the edge of said opening, the ends of the said parts being located in the depression formed around the said opening.

2. The socket member of a snap fastener consisting of a single plate having an opening therethrough at its center and the outer portion of which plate is bent over into operative relation to the central portion thereof, the integral bend connecting the said portions constituting the outer edge of the said member and said outer bent over portion being provided with spring holding parts which project through said opening.

3. The socket member of a snap fastener consisting of a plate having an opening at the center thereof and the outer portion of which plate is bent over and is in operative relation to the central portion thereof, the integral bend connecting the said portions constituting the outer edge of said member, and the said outer portion being provided with projections which extend through said opening and are bent over and around the edge of the same and constitute the holding parts of the member.

4. The socket member of a snap fastener which consists of two thicknesses of metallic plate arranged in approximate parallel relation to each other, the outer edges of which are integrally connected and one of which thicknesses of plate is provided with a central opening and the other of which is provided with pointed projections which extend through and are bent around the edge of the said opening and are spaced therefrom.

5. The socket member of a snap fastener which consists of two thicknesses of metallic plate, the outer edges of which are integrally connected and one of which thicknesses of plate is provided with a central opening and the other with projections which extend through and are bent around the edge of the said opening and are spaced therefrom, and the adjacent edges of said projections upon one side of said socket member being arranged in close relation to each other and upon the opposite side of the said socket member being separated and divergent from each other.

6. The socket member of a snap fastener consisting of a metallic plate having a central portion provided with an opening therein and a portion bent over and into operative relation to the said central portion, the bend connecting the said portions constituting the outer edge of the said member and the said bent over portion being provided with projections which projections are bent and extended through the said opening and are curved around the edge of the same, the radius of curvature being relatively large, whereby the bent over projections are normally out of contact with the edge of the said opening and are also out of contact with the portion of the plate surrounding said edge.

7. The socket member of a snap fastener consisting of a plate having a central opening therethrough and having prongs projecting from the edge of said plate inwardly thereover and being extended through the said opening and bent around the edge thereof, the said prongs being operatively related to the portion of the said plate surrounding the said opening.

In testimony that I claim the foregoing as my invention I have hereunto signed my name this 19th day of July, A. D. 1911.

JAMES P. WILLIAMS.

In the presence of—
EDWARD J. FISHER,
CYRUS N. ANDERSON.